United States Patent
Brennan et al.

(10) Patent No.: US 10,104,642 B2
(45) Date of Patent: Oct. 16, 2018

(54) EVENT-TRIGGERED CONTROL OF BEACON BROADCASTS

(71) Applicant: Microsoft Technology Licensing, LLC, Redmond, WA (US)

(72) Inventors: David J. Brennan, Redmond, WA (US); Nicholas H. Wrem, Seattle, WA (US); David Michael Gray, Bellevue, WA (US); Hubert Van Hoof, Seattle, WA (US); Igor V. Grebnev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 15/081,751

(22) Filed: Mar. 25, 2016

(65) Prior Publication Data

US 2017/0280420 A1    Sep. 28, 2017

(51) Int. Cl.
*H04W 72/00* (2009.01)
*H04W 4/80* (2018.01)
(Continued)

(52) U.S. Cl.
CPC ......... *H04W 72/005* (2013.01); *H04W 4/025* (2013.01); *H04W 4/06* (2013.01); *H04W 4/80* (2018.02); *H04W 16/28* (2013.01)

(58) Field of Classification Search
CPC ...... H04B 5/0031; G08B 5/22; G08B 21/182; G06Q 10/109; H04W 4/008; H04W 4/12;
(Continued)

(56) References Cited

U.S. PATENT DOCUMENTS 9,043,602 B1   5/2015   Krieger et al.
9,107,152 B1   8/2015   Wurster
(Continued)

FOREIGN PATENT DOCUMENTS

CN   104219065 A   12/2014
CN   204498381 U    7/2015

OTHER PUBLICATIONS

Estimote Team, "Adjust beacon range with Estimote's new App and change UUID using Estimote's new SDK", the Estimote Team Blog, Jan. 28, 2014, pp. 4, Estimote, Inc., retrieved at <<http://blog.estimote.com/post/74816977799/estimote-app-v1-2>>.
(Continued)

*Primary Examiner* — Marsha D. Banks Harold
*Assistant Examiner* — Dharmesh Patel

(57) ABSTRACT

Broadcasts from beacon devices each of which is disposed in a known different physical location within a venue are controlled. Scheduling information for events scheduled to take place at the venue may be collected from calendar management sources and analyzed. Notification of an emergent event associated with the venue or its geographic location may also be received from emergent event notification sources and analyzed. The result of these analyses and the knowledge of the physical location of each of the beacon devices are used to generate a set of broadcast rules for each of the beacon devices, where these rules specify one or more beacon signals to be periodically broadcast by the beacon device and the timing by which these signals are to be broadcast. For each of the beacon devices, the set of broadcast rules for the beacon device is downloaded to the beacon device.

17 Claims, 5 Drawing Sheets

(51) Int. Cl.
*H04W 4/02* (2018.01)
*H04W 16/28* (2009.01)
*H04W 4/06* (2009.01)

(58) Field of Classification Search
CPC ..... H04W 4/206; H04W 8/005; H04W 48/12; H04W 76/02; H04W 88/06; H04W 88/08; H04L 12/189; H04L 12/1845; H04L 12/1895; H04L 67/02; H04L 67/10; H04L 67/18; H04L 67/306; Y02B 60/50
See application file for complete search history.

(56) References Cited

U.S. PATENT DOCUMENTS

| | | | |
|---|---|---|---|
| 9,202,245 | B2 | 12/2015 | Kostka et al. |
| 9,600,946 | B1* | 3/2017 | Gerace ............... G07C 9/00103 |
| 2014/0220883 | A1 | 8/2014 | Emigh et al. |
| 2015/0036823 | A1 | 2/2015 | Graube |
| 2015/0103756 | A1 | 4/2015 | Sinha |
| 2015/0140982 | A1* | 5/2015 | Postrel ................. H04W 4/008 455/418 |
| 2015/0278867 | A1 | 10/2015 | Lerman et al. |
| 2015/0280930 | A1* | 10/2015 | Zamer ................ H04L 12/1845 455/41.1 |

OTHER PUBLICATIONS

Estimote Team, "iBeacon security: understanding the risks", the Estimote Team Blog, Dec. 9, 2014, pp. 6, Estimote, Inc., retrieved at <<http://blog.estimote.com/post/104765561910/ibeacon-security-understanding-the-risks>>.

Localz Pty. Ltd., "iBeacon security overview", Mar. 2, 2015, pp. 12, LinkedIn Corporation, retrieved at <<http://www.slideshare.net/localzco/beacon-security-overview>>.

Natan, "Updating app every 10 minutes within a beacon region", May 12, 2015, pp. 1, Stack Exchange Inc., retrieved at <<http://stackoverflow.com/questions/30179746/updating-app-every-10-minutes-within-a-beacon-region>>.

Praveen, "Are iBeacon advertising IDs unique?", Jan. 14, 2014, pp. 3, Stack Exchange Inc., retrieved at <<http://stackoverflow.com/questions/21123506/are-ibeacon-advertising-ids-unique>>.

Robins, "Using the secret sauce of mobile location-based services", Jul. 2015, pp. 5, TechTarget, retrieved at <<http://searchcrm.techtarget.com/feature/Using-the-secret-sauce-of-mobile-location-based-services>>>.

Sanders, J. R., et al, U.S. Appl. No. 15/054,163, Feb. 26, 2016, pp. 1-66.

Shetty, "Design and Implementation of an Open Beaconing Architecture for Internet of Things", Presented to the Faculty of the Graduate School of the University of Texas at Arlington in Partial Fulfillment of the Requirements for the Degree of Master of Science in Computer Science and Engineering, May 2015, pp. 36, retrieved at <<https://uta-ir.tdl.org/uta-ir/bitstream/handle/10106/25050/BhaskarShetty_uta_2502M_13088.pdf?sequence=1>>.

Steczkiewicz, "How to modify UUID, Major, and Minor values?", Aug. 27, 2015, pp. 9, Estimote, Inc., retrieved at <<https://community.estimote.com/hc/en-us/articles/200868188-How-to-modify-UUID-Major-and-Minor-values->>.

"International Search Report and Written Opinion Issued in PCT Application No. PCT/US17/023272", dated May 23, 2017, 17 Pages.

* cited by examiner

EVENT-TRIGGERED CONTROL OF BEACON BROADCASTS

BACKGROUND

Beacon devices that periodically broadcast a beacon signal containing a small amount of data using a prescribed short-range wireless communication technology are increasingly being deployed in (e.g., installed into) a variety of venues across the globe. Compact, low-cost, typically battery operated versions of such beacon devices are commercially available from a large and increasing number of manufacturers. A given mobile computing device that is configured to support this wireless communication technology may detect (e.g., wirelessly receive and decode) the beacon signal that is periodically broadcast by a given beacon device whenever the mobile computing device is within the broadcast range (e.g., the coverage zone) of the beacon device. Based on this detection the mobile computing device may then determine its current context or physical location and automatically trigger one or more prescribed context-based or location-based actions/functions that may include providing the user of the mobile computing device with a prescribed context-based or location-based service.

SUMMARY

Beacon broadcasting technique implementations described herein generally control broadcasts from one or more beacon devices each of which is disposed in a known different physical location within a venue. In one exemplary implementation scheduling information for one or more events that are scheduled to take place at the venue is collected from one or more calendar management sources. This collected scheduling information is then analyzed. The result of this analysis and the knowledge of the physical location of each of the beacon devices are then used to generate a set of broadcast rules for each of the beacon devices, where these rules specify one or more beacon signals that are to be periodically broadcast by the beacon device and the timing by which these signals are to be broadcast. Then, for each of the beacon devices, the set of broadcast rules for the beacon device is downloaded to the beacon device.

In another exemplary implementation notification of an emergent event that is associated with the venue or its geographic location is received from one or more emergent event notification sources. This received notification is then analyzed. The result of this analysis and the knowledge of the physical location of each of the beacon devices are then used to generate a set of broadcast rules for each of the beacon devices, where these rules specify one or more beacon signals that are to be periodically broadcast by the beacon device and the timing by which these signals are to be broadcast, and these signals include data that is specifically related to the emergent event. Then, for each of the beacon devices, the set of broadcast rules for the beacon device is downloaded to the beacon device.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the beacon broadcasting technique implementations described herein will become better understood with regard to the following description, appended claims, and accompanying drawings where:

DETAILED DESCRIPTION

Figure 1:
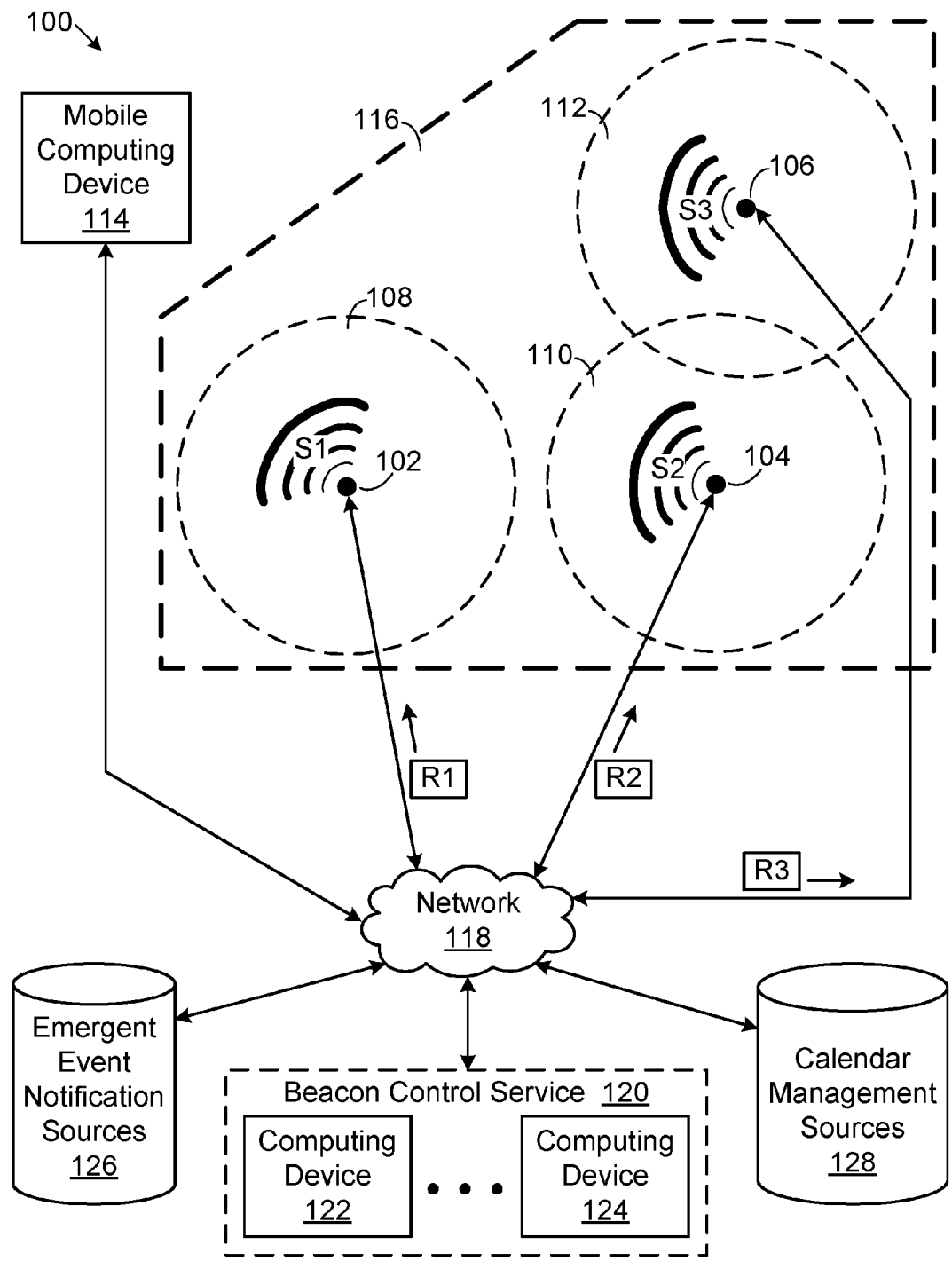
FIG. 1 is a diagram illustrating one implementation, in simplified form, of a system framework for realizing the beacon broadcasting technique implementations described herein.

In the following description of beacon broadcasting technique implementations reference is made to the accompanying drawings which form a part hereof, and in which are shown, by way of illustration, specific implementations in which the beacon broadcasting technique can be practiced. It is understood that other implementations can be utilized and structural changes can be made without departing from the scope of the beacon broadcasting technique implementations.

It is also noted that for the sake of clarity specific terminology will be resorted to in describing the beacon broadcasting technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the beacon broadcasting technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the beacon broadcasting technique does not inherently indicate any particular order nor imply any limitations of the beacon broadcasting technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Event-Triggered Control of Beacon Broadcasts

The beacon broadcasting technique implementations described herein generally involve the event-triggered control of broadcasts from one or more beacon devices each of which is disposed in a known different physical location within a venue. More particularly and as will be described in more detail hereafter, the beacon broadcasting technique implementations dynamically control the broadcasts from each of the beacon devices using a set of broadcast rules (e.g., instructions) for the beacon device that is generated on-the-fly based on various types of event triggers which can include, but are not limited to, events that are scheduled to take place at the venue, or emergent events that are associated with the venue or its geographic location. The term "emergent event" is used herein to refer to an unscheduled event that arises/occurs unexpectedly. The set of broadcast rules that is generated for a given beacon device can specify many different attributes of the broadcasts that occur from the beacon device. By way of example but not limitation, and as will be described in more detail hereafter, in an exemplary implementation of the beacon broadcasting technique described herein the set of broadcast rules that is generated for a given beacon device specify one or more beacon signals that are to be periodically broadcast by the beacon device and the timing by which these signals are to be broadcast. In other words, the set of broadcast rules that is generated for a given beacon device define what gets broadcast by the beacon device and when it gets broadcast. It will thus be appreciated that the beacon broadcasting technique implementations can dynamically change what is being broadcast by each of the beacon devices based on event triggers. More particularly, the beacon broadcasting technique implementations allow the beacon broadcasts for a given venue to be dynamically configured based on events that are scheduled to take place at the venue, or emergent events that are associated with the venue or its geographic location, or a combination thereof. As will be described in more detail hereafter, the set of broadcast rules that is generated for a given beacon device can optionally also specify the broadcast power for the beacon device, and the interval of time between successive broadcasts by the beacon device.

The beacon broadcasting technique implementations described herein are advantageous for various reasons including, but not limited to, the following. As will be appreciated from the more-detailed description that follows, the beacon broadcasting technique implementations are operable in both indoor and outdoor environments. The beacon broadcasting technique implementations are also operable with many different types of mobile computing devices and many different types of beacon devices. The beacon broadcasting technique implementations are also operable with many different types of wireless communication technologies examples of which will be described in more detail hereafter. The beacon broadcasting technique implementations also consume very little energy and thus, minimize the battery drain and maximize the battery life in any mobile computing device and any beacon device that is used with the beacon broadcasting technique implementations. The beacon broadcasting technique implementations also eliminate the need for users to specify their current physical location, and thus address users' privacy concerns. The beacon broadcasting technique implementations further address users' privacy concerns since the beacon devices that are deployed within (e.g., installed into) a given venue have no idea which if any mobile computing devices may be within the broadcast range of (e.g., proximal to) one or more of the beacon devices and thus may be detecting the beacon devices' broadcasts.

The beacon broadcasting technique implementations described herein are also operable with a wide variety of mobile software applications (hereafter simply referred to as mobile applications) that provide various types of context-based and location-based services to mobile computing device users. Examples of such mobile applications include automated payment applications, automated check-in applications, retail shopping applications, advertising applications, content delivery applications, geo-fencing applications, ranging applications, and geo-location applications, among many others. The beacon broadcasting technique implementations also simplify the deployment of beacon devices in a given venue, and eliminate the issues that can arise when the broadcast range (e.g., the coverage zone) of one beacon device overlaps the broadcast ranges of one or more other beacon devices, which is often the case in high-density deployments. For example, the beacon broadcasting technique implementations allow a mobile application that is running in the background on a given mobile computing device to be notified (e.g., awoken) when the mobile computing device is positioned within the broadcast range of one beacon device that is broadcasting a beacon signal that matches the beacon signal being broadcast by another beacon device whose broadcast range also covers the mobile computing device. The beacon broadcasting technique implementations also allow the mobile application to be notified when the mobile computing device is not actively moving. As such, the beacon broadcasting technique implementations ensure accurate and reliable beacon signal detection by the mobile computing device regardless of the deployment configuration of the beacon devices and the movement pattern of the mobile computing device.

FIG. 1 illustrates one implementation, in simplified form, of a system framework for realizing the beacon broadcasting technique implementations described herein. As exemplified in FIG. 1, the system framework 100 includes one or more beacon devices 102/104/106, each of which is disposed (e.g., deployed) in a known, different static physical location within a given venue 116. Generally speaking, each of the beacon devices 102/104/106 is configured to periodically (e.g., recurring at one or more prescribed intervals of time) broadcast, using a prescribed short-range wireless communication technology, one or more beacon signals S1/S2/S3 over a prescribed broadcast range 108/110/112. It will be appreciated that in a given deployment of beacon devices, the broadcast ranges of two or more of the beacon devices may overlap. For example, in the deployment of the beacon devices 102/104/106 shown in FIG. 1, the broadcast range 110 of the beacon device 104 overlaps the broadcast range 112 of the beacon device 106.

Referring again to FIG. 1, each of the beacon devices 102/104/106 is also configured to communicate over a data communication network 118 such as the Internet (among other types of networks) with a beacon control service 120 that operates (e.g., runs) on one or more other computing devices 122/124. These other computing devices 122/124 can also communicate with each other via the network 118. In one implementation of the beacon broadcasting technique described herein the other computing devices 122/124 are located in the cloud so that the beacon control service 120 operates as a cloud service and the network includes wide area network functionality. The term "cloud service" is used herein to refer to an application that operates in the cloud and can be hosted on (e.g., deployed at) a plurality of data centers that can be located in different geographic regions (e.g., different regions of the world). In another implementation of the beacon broadcasting technique the other computing devices 122/124 are located on the premises of the venue 116 so that the beacon control service 120 operates as a local service and the network 118 includes either local area network functionality, or personal area network functionality, or a combination thereof.

As will be described in more detail hereafter and referring again to FIG. 1, the one or more beacon signals S1/S2/S3 that are broadcast by a given beacon device 102/104/106 are specified by a set of broadcast rules R1/R2/R3 that is downloaded over the data communication network 118 from the beacon control service 120 to the beacon device. More particularly, beacon device 102 periodically broadcasts one or more beacon signals S1 over the broadcast range 108, where these signals S1 are specified by the set of broadcast rules R1 that is downloaded from the beacon control service 120 to the beacon device 102. Beacon device 104 periodically broadcasts one or more beacon signals S2 over the broadcast range 110, where these signals S2 are specified by the set of broadcast rules R2 that is downloaded from the beacon control service 120 to the beacon device 104, and each of the beacon signals S2 may be either the same as or different than one of the beacon signals S1 that is broadcast by the beacon device 102. Beacon device 106 periodically broadcasts one or more beacon signals S3 over the broadcast range 112, where these signals S3 are specified by the set of broadcast rules R3 that is downloaded from the beacon control service 120 to the beacon device 106, and each of the beacon signals S3 may be either the same as or different than one of the beacon signals S1 or S2 that is broadcast by the beacon device 102 or the beacon device 104.

Referring again to FIG. 1, the system framework 100 also includes one or more calendar management sources 128 that provide the beacon control service 120 with scheduling information for events that are scheduled to take place at the venue 116. The beacon broadcasting technique implementations described herein are compatible with various types of calendar management sources 128. By way of example but not limitation, in one implementation of the beacon broadcasting technique described herein the calendar management sources 128 include a shared calendaring application that runs on the one or more computing devices 122/124 (e.g., a cloud-based calendaring application such as Google Calendar, or the like). In another implementation of the beacon broadcasting technique the calendar management sources 128 include one or more personal calendaring applications that run on the client computing devices of one or more users who visit the venue 116 (e.g., the mobile computing device 114) and are in communication with the beacon control service 120 via the data communication network 118. In yet another implementation of the beacon broadcasting technique the calendar management sources 128 include a venue-specific calendaring application that runs on either the one or more computing devices 122/124, or one or more other computing devices (not shown) that are in communication with the beacon control service 120 via the network 118. As will be described in more detail hereafter, in yet another implementation of the beacon broadcasting technique the beacon control service 120 can analyze the event scheduling information that it collects from the calendar management sources 128, and then use the result of this analysis and the knowledge of the physical location of each of the beacon devices 102/104/106 to generate (e.g., compute) the set of broadcast rules R1/R2/R3 for each of the beacon devices.

Referring again to FIG. 1, the system framework 100 also includes one or more emergent event notification sources 126 that provide the beacon control service 120 with notification of an emergent event that is associated with the venue 116 or its geographic location. The beacon broadcasting technique implementations described herein are compatible with various types of emergent event notification sources 126. By way of example but not limitation, in one implementation of the beacon broadcasting technique described herein the emergent event notification sources 126 include the conventional Integrated Public Alert and Warning System (IPAWS) that is in communication with the beacon control service 120 via the data communication network 118. As is appreciated in the art of public warning systems, IPAWS integrates public alerts from various federal, state and local public emergency warning systems such as the conventional Emergency Alert System (EAS), the conventional National Warning System (NAWAS), the conventional Commercial Mobile Alert System (CMAS), and the conventional National Oceanic and Atmospheric Administration (NOAA) Weather Radio (NWR) alert system, among others. In another implementation of the beacon broadcasting technique the emergent event notification sources 126 include a facility monitoring system that is configured to monitor one or more conditions in one or more portions of the venue 116, and is in communication with the beacon control service 120 via the network 118. In yet another implementation of the beacon broadcasting technique the aforementioned calendar management sources 128 can also provide the beacon control service 120 with notification of an emergent event that is associated with the venue 116. For example, in the case where an event that was scheduled for the venue 116 or a portion thereof has just been cancelled, this cancellation is considered to be an emergent event. As will be described in more detail hereafter, in yet another implementation of the beacon broadcasting technique the beacon control service 120 can analyze the emergent event notification that it receives from the emergent event notification sources 126, and then use the result of this analysis and the knowledge of the physical location of each of the beacon devices 102/104/106 to generate the set of broadcast rules R1/R2/R3 for each of the beacon devices.

As is appreciated in the art of wireless communication and referring again to FIG. 1, the broadcast range 108/110/112 of a given beacon device 102/104/106 depends on various factors such as the broadcast power (e.g., the broadcast signal strength) of the beacon device, the particular type of wireless communication technology that the beacon device is using, the particular type and physical configuration of the venue 116 that the beacon device is disposed in, the particular physical location within the venue where the beacon device is disposed, and the presence of one or more non-static obstacles (not shown) (e.g., humans and animals, among other types of non-static obstacles) near the beacon device. The beacon broadcasting technique implementations described herein can support any format for the beacon signals S1/S2/S3 that are broadcast by the beacon devices 102/104/106. By way of example but not limitation, in one implementation of the beacon broadcasting technique described herein the one or more beacon signals S1/S2/S3 that are broadcast by each of the beacon devices 102/104/106 include a conventional Globally Unique Identifier (GUID) (also known as a Universally Unique Identifier (UUID)) data field. As is appreciated in the art of computer software development this GUID/UUID data field is a 128-bit integer number that is used to uniquely identify resources, entities, contexts, physical locations, events, and the like. The one or more beacon signals S1/S2/S3 that are broadcast by each of the beacon devices 102/104/106 can optionally also include one or more additional data fields that are used to provide additional information about the identified resource/entity/context/location/event. Examples of such additional data fields include, but are not limited to a conventional major identifier (ID) data field, a conventional minor ID data field, and a data field having customizable data that is associated with the identified resource/entity/context/location/event. As is also appreciated in the art of computer software development these major and minor ID data fields are both 16-bit integer numbers. The customizable data field can have any prescribed size. In another implementation of the beacon broadcasting technique the one or more beacon signals S1/S2/S3 that are broadcast by each of the beacon devices 102/104/106 have a conventional IBEACON® (a registered trademark of Apple Inc.) format. In yet another implementation of the beacon broadcasting technique the one or more beacon signals S1/S2/S3 that are broadcast by each of the beacon devices 102/104/106 have a conventional EDDYSTONE™ (a trademark of Google, Inc.) format.

It will be appreciated that the just-described GUID/UUID, major ID, and minor ID values can be used in a variety of ways. For example, consider a scenario where Company XYZ owns a chain of coffee shops into which beacon devices have been strategically deployed, and Company XYZ has a mobile application that can be utilized by mobile computing device users when they arrive at a given one of the coffee shops. In this scenario the GUID/UUID can uniquely identify Company XYZ's mobile application, the major ID can uniquely identify each of the different coffee shops, and the minor ID can uniquely identify different regions within a given coffee shop (e.g., near the front door, or near the cash register, or near the counter where the drink orders are placed, or the like).

The just-described data field having customizable data that is associated with the identified resource/entity/context/location/event can also be used in a variety of ways. By way of example but not limitation, consider a scenario where the venue is an office building and beacon devices have been deployed into each of the offices and conference rooms in the building. The data field having customizable data may specify a conventional Uniform Resource Locator (URL) that is associated with the venue (e.g., the URL may provide a map of the venue, or information about a given event that is scheduled for the venue, among other things) and this URL may be provided to mobile computing device users when they arrive at the venue or certain locations within the venue. The data field having customizable data may also specify a message that is to be displayed on the mobile computing device of a user when they arrive at the venue or certain locations within the venue, where this message may be related to an emergent event that is associated with the venue or its geographic location, among other things.

As described heretofore and referring again to FIG. 1, the beacon broadcasting technique implementations described are operable with many different types of wireless communication technologies. By way of example but not limitation, in a tested implementation of the beacon broadcasting technique described herein the wireless communication technology that is used by each of the beacon devices 102/104/106 was the conventional BLUETOOTH® (a registered certification mark of Bluetooth SIG (Special Interest Group), Inc.) Low Energy personal-area network technology (also known as Bluetooth LE and BLE, and marketed as BLUETOOTH SMART® (a registered trademark of Bluetooth SIG, Inc.)). Another implementation of the beacon broadcasting technique is possible were the wireless communication technology that is used by each of the beacon devices 102/104/106 is the conventional ANT sensor network technology. Yet another implementation of the beacon broadcasting technique is also possible where the wireless communication technology that is used by each of the beacon devices 102/104/106 is the conventional near-field communications (NFC) technology.

Referring again to FIG. 1, the system framework 100 also includes a mobile computing device 114 that is carried by user (not shown). The beacon broadcasting technique implementations described are operable with many different types of mobile computing devices. For example, in an exemplary implementation of the beacon broadcasting technique described herein the mobile computing device 114 is either a conventional smartphone, or a conventional tablet computer, or a conventional laptop computer (sometimes also referred to as a netbook or notebook computer). The mobile computing device 114 is configured to detect (e.g., wirelessly receive and decode) the one or more beacon signals S1/S2/S3 that are broadcast by a given beacon device 102/104/106 whenever the mobile computing device is within the broadcast range 108/110/112 of the beacon device. For example, the mobile computing device 114 will detect the beacon signals S1 that are broadcast by the beacon device 102 whenever the mobile computing device is within the broadcast range 108 of the beacon device 102. The mobile computing device 114 will detect the beacon signals S2 that are broadcast by the beacon device 104 whenever the mobile computing device is within the broadcast range 110 of the beacon device 104. The mobile computing device 114 will detect the beacon signals S3 that are broadcast by the beacon device 106 whenever the mobile computing device is within the broadcast range 112 of the beacon device 106. The mobile computing device 114 is also configured to communicate over the data communication network 118 with the beacon control service 120.

Referring again to FIG. 1, upon the mobile computing device 114 detecting the one or more beacon signals S1/S2/S3 that are broadcast by a given beacon device 102/104/106, the mobile computing device may automatically trigger a prescribed mobile application on the mobile computing device to perform a prescribed action on the mobile computing device. Examples of such actions will be described in more detail hereafter. In the case where the application is running in the background on the mobile computing device the just-described triggering includes waking up the application. The beacon broadcasting technique implementations described herein thus assume that the beacon control service 120 has made the mobile computing device 114 aware of the beacon signals S1/S2/S3 that are broadcast by the beacon devices 102/104/106.

Figure 2:
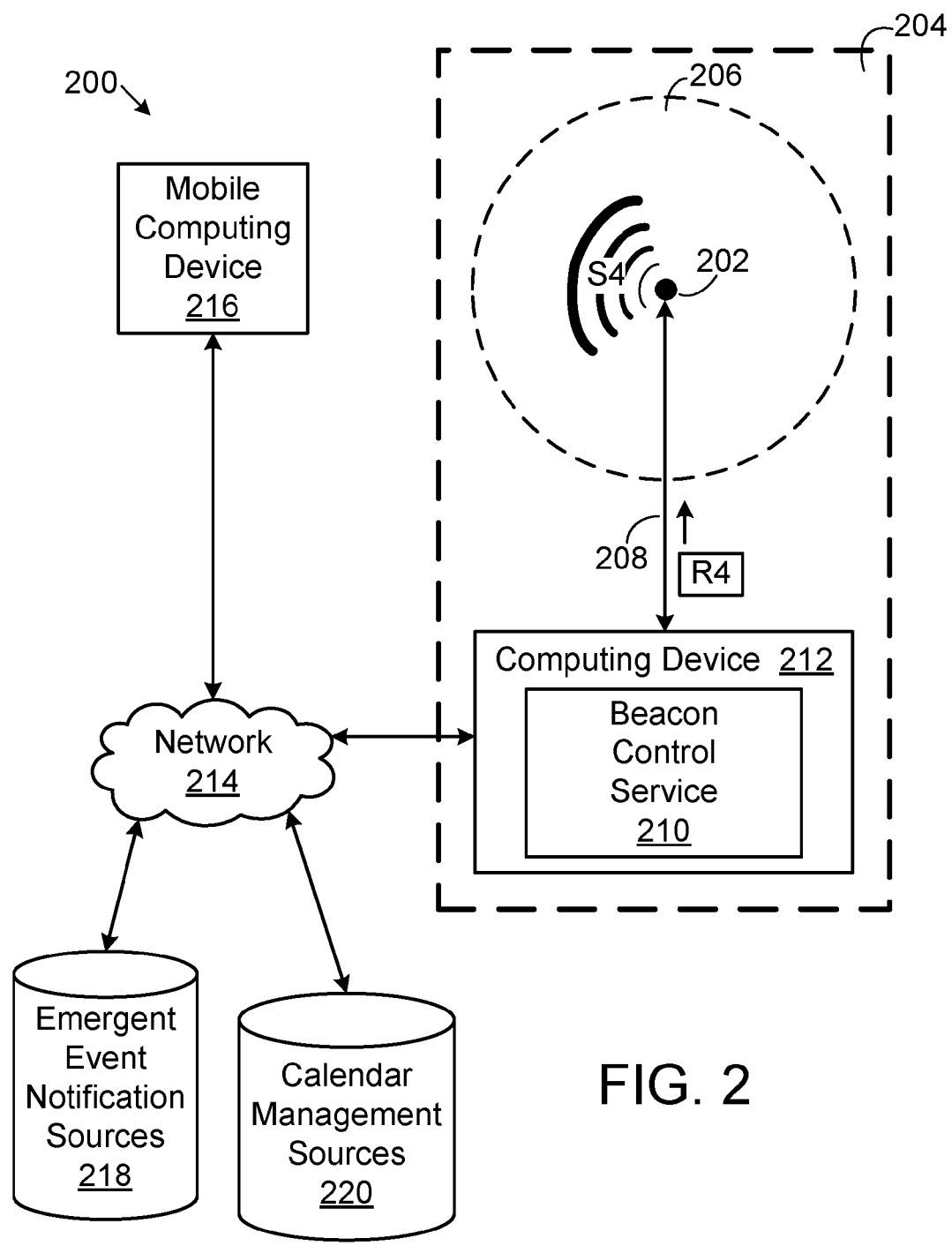
FIG. 2 is a diagram illustrating another implementation, in simplified form, of a system framework for realizing the beacon broadcasting technique implementations described herein.

FIG. 2 illustrates another implementation, in simplified form, of a system framework for realizing the beacon broadcasting technique implementations described herein. As exemplified in FIG. 2, the system framework 200 includes a single beacon device 202 that is disposed in a static physical location within a given venue 204, where the beacon device 202 is configured to periodically broadcast, using the aforementioned short-range wireless communication technology, one or more beacon signals S4 over a prescribed broadcast range 206. The beacon device 202 is also configured to communicate over a dedicated connection 208 (e.g., a conventional Universal Serial Bus (USB) connection, among other types of dedicated connections) with a beacon control service 210 that operates on a computing device 212 which is located adjacent to the beacon device 202. The one or more beacon signals S4 that are broadcast by the beacon device 202 are specified by a set of broadcast rules R4 that is downloaded over the dedicated connection 208 from the beacon control service 210 to the beacon device.

Referring again to FIG. 2, the system framework 200 also includes the aforementioned mobile computing device 216 that is carried by a user (not shown), and is configured to detect the one or more beacon signals S4 that are broadcast by the beacon device 202 whenever the mobile computing device 216 is within the broadcast range 206 of the beacon device. The mobile computing device 216 is also configured to communicate over the aforementioned data communication network 214 with the beacon control service 210 that operates on the computing device 212. As will be appreciated from the more-detailed description that follows, whereas the system framework 100 shown in FIG. 1 is applicable to situations where the venue 116 is a medium size or large size facility (e.g., an office building, a corporate campus, a shopping mall, a sports arena, or the like), the system framework 200 shown in FIG. 2 is applicable to situations where the venue 204 is small (e.g., a single room, a small retail establishment, or the like). It is noted that an alternate implementation (not shown) of the system framework 200 is also possible where the beacon device 202 is integrated within the computing device 212 (e.g., a conventional smartphone or tablet computer commonly includes short-range wireless communication technology that allows it to function as a beacon device).

Referring again to FIG. 2, the system framework 200 also includes the aforementioned one or more calendar management sources 220 that provide the beacon control service 210 with scheduling information for events that are scheduled to take place at the venue 204. In one implementation of the beacon broadcasting technique described herein the calendar management sources 220 include the aforementioned shared calendar application that runs on the computing device 212. In another implementation of the beacon broadcasting technique the calendar management sources 220 include one or more personal calendaring applications that run on the client computing devices of one or more users who visit the venue 204 (e.g., the mobile computing device 216) and are in communication with the beacon control service 210 via the data communication network 214. In yet another implementation of the beacon broadcasting technique the calendar management sources 220 include a venue-specific calendaring application that runs on either the computing device 210, or one or more other computing devices (not shown) that are in communication with the beacon control service 210 via the network 214. As will be described in more detail hereafter, in yet another implementation of the beacon broadcasting technique the beacon control service 210 can analyze the event scheduling information that it collects from the calendar management sources 220, and then use the result of this analysis and the knowledge of the physical location of the beacon device 202 to generate the set of broadcast rules R4 for the beacon device.

Referring again to FIG. 2, the system framework 200 also includes the aforementioned one or more emergent event notification sources 218 that provide the beacon control service 210 with notification of an emergent event that is associated with the venue 204 or its geographic location. In one implementation of the beacon broadcasting technique described herein the emergent event notification sources 218 include the aforementioned IPAWS system that is in communication with the beacon control service 210 via the data communication network 214. In another implementation of the beacon broadcasting technique the emergent event notification sources 218 include a facility monitoring system that is configured to monitor one or more conditions in one or more portions of the venue 204, and is in communication with the beacon control service 210 via the network 214. In yet another implementation of the beacon broadcasting technique the calendar management sources 220 can also provide the beacon control service 210 with notification of an emergent event that is associated with the venue 204. As will be described in more detail hereafter, in yet another implementation of the beacon broadcasting technique the beacon control service 210 can analyze the emergent event notification that it receives from the emergent event notification sources 218, and then use the result of this analysis and the knowledge of the physical location of the beacon device 202 to generate the set of broadcast rules R4 for the beacon device.

Referring again to FIGS. 1 and 2, the set of broadcast rules R1/R2/R3/R4 that is generated for and downloaded to a given beacon device 102/104/106/202 can specify many different attributes of the broadcasts that occur from the beacon device. By way of example but not limitation, in one implementation of the beacon broadcasting technique described herein the set of broadcast rules that is generated for and downloaded to a given beacon device specifies a list of different beacon signals to be periodically broadcast on a rotating basis by the beacon device, and a rotation time interval specifying how often the beacon device is to change the beacon signal it is periodically broadcasting. In one version of this particular implementation a default interval of time between successive broadcasts of each of the different beacon signals in this list (e.g., the broadcast interval for the beacon device) is pre-programmed into the beacon device. In an alternate version of this particular implementation the interval of time between successive broadcasts of each of the different beacon signals in the list is also specified by the set of broadcast rules that is generated for and downloaded to the beacon device. It is noted that the list of different beacon signals to be periodically broadcast on a rotating basis by the beacon device can have any plurality of different beacon signals. For example, in a tested version of the beacon broadcasting technique implementations described herein this list included between two and four different beacon signals each having a GUID data field, a major ID data field, and a minor ID data field.

Referring again to FIGS. 1 and 2, in another implementation of the beacon broadcasting technique described herein the set of broadcast rules R1/R2/R3/R4 that is generated for and downloaded to a given beacon device 102/104/106/202 specifies a static beacon signal to be periodically broadcast by the beacon device. In one version of this particular implementation a default interval of time between successive broadcasts of the static beacon signal is pre-programmed into the beacon device. In an alternate version of this particular implementation the interval of time between successive broadcasts of the static beacon signal is also specified by the set of broadcast rules that is generated for and downloaded to the beacon device. In yet another implementation of the beacon broadcasting technique the set of broadcast rules that is generated for and downloaded to a given beacon device specifies the broadcast power for the beacon device. Accordingly, this particular implementation advantageously provides the ability to individually adjust the broadcast range 108/110/112/206 of each of the beacon devices (e.g., increasing its broadcast power generally increases its broadcast range, and decreasing its broadcast power generally decreases its broadcast range). In yet another implementation of the beacon broadcasting technique, for each of the beacon devices, the set of broadcast rules that is generated for and downloaded to the beacon device is coordinated with the sets of broadcast rules that are generated for and downloaded to others of the beacon devices which are nearby the beacon device so as to eliminate conflict and unwanted interference between the beacon signals being periodically broadcast by the beacon device and the beacon signals being periodically broadcast by these others of the beacon devices.

Figure 3:
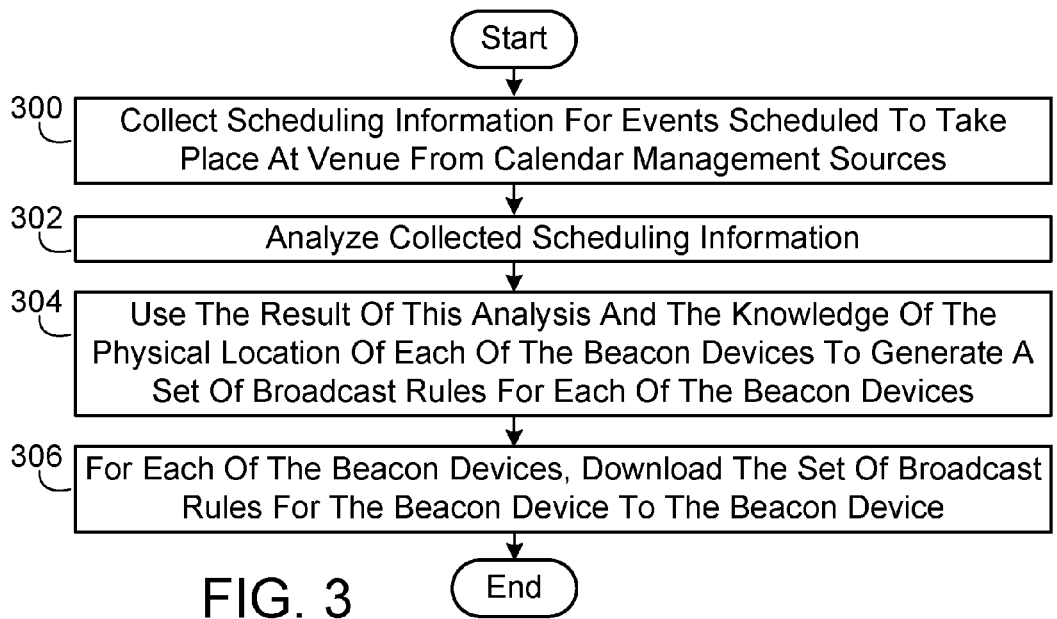
FIG. 3 is a flow diagram illustrating one implementation, in simplified form, of a process for controlling broadcasts from one or more beacon devices each of which is disposed in a known different physical location within a venue.

FIG. 3 illustrates one implementation, in simplified form, of a process for controlling broadcasts from one or more beacon devices each of which is disposed in a known different physical location within a venue. As exemplified in FIG. 3, the process starts with collecting scheduling information for one or more events that are scheduled to take place at the venue from one or more calendar management sources (process action 300). This collected scheduling information is then analyzed (process action 302). The result of this analysis and the knowledge of the physical location of each of the beacon devices is then used to generate a set of broadcast rules for each of the beacon devices (process action 304), where these rules specify one or more beacon signals to be periodically broadcast by the beacon device and the timing by which these signals are to be broadcast. For each of the beacon devices, the set of broadcast rules for the beacon device is then downloaded to the beacon device (process action 306). Given the foregoing and the exemplary application scenarios that are described hereafter, it will be appreciated that the set of broadcast rules that is generated for and downloaded to each of the beacon devices in the process shown in FIG. 3 has the technical effect of improving the operation of a given mobile computing device by insuring accurate and reliable beacon signal detection by the mobile computing device regardless of the deployment configuration of the beacon devices and the movement pattern of the mobile computing device.

Figure 4:
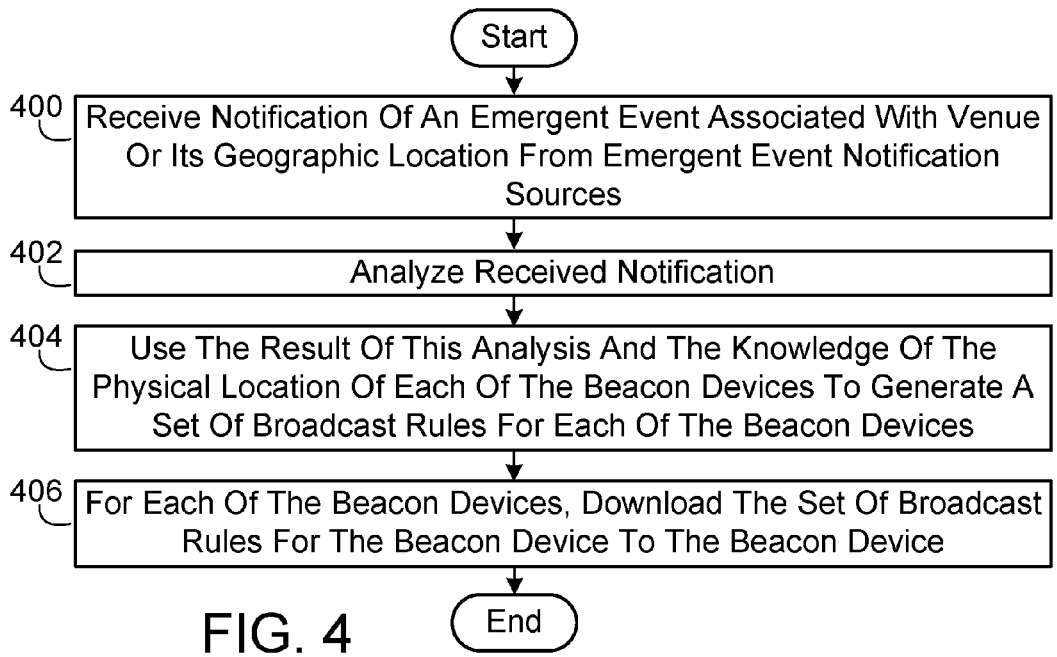
FIG. 4 is a flow diagram illustrating another implementation, in simplified form, of a process for controlling broadcasts from one or more beacon devices each of which is disposed in a known different physical location within a venue.

FIG. 4 illustrates another implementation, in simplified form, of a process for controlling broadcasts from one or more beacon devices each of which is disposed in a known different physical location within a venue. As exemplified in FIG. 4, the process starts with receiving notification of an emergent event that is associated with the venue or its geographic location from one or more emergent event notification sources (process action 400). This received notification is then analyzed (process action 402). The result of this analysis and the knowledge of the physical location of each of the beacon devices is then used to generate a set of broadcast rules for each of the beacon devices (process action 404), where these rules specify one or more beacon signals to be periodically broadcast by the beacon device and the timing by which these signals are to be broadcast. In an exemplary version of the beacon broadcasting technique implementations described herein the beacon signals that are specified by the set of broadcast rules for each of the beacon devices include data that is specifically related to the emergent event (e.g., information about the emergent event, or user instructions associated with the emergent event, or the like). For each of the beacon devices, the set of broadcast rules for the beacon device is then downloaded to the beacon device (process action 406). Given the foregoing and the exemplary application scenarios that are described hereafter, it will be appreciated that the set of broadcast rules that is generated for and downloaded to each of the beacon devices in the process shown in FIG. 4 has the technical effect of improving the operation of a given mobile computing device by insuring accurate and reliable beacon signal detection by the mobile computing device regardless of the deployment configuration of the beacon devices and the movement pattern of the mobile computing device.

It is noted that the beacon broadcasting technique implementations described herein may be realized in a wide variety of application scenarios. Several examples of such scenarios will now be described in more detail in order to provide a more thorough understanding of the beacon broadcasting technique implementations. It is noted that in addition to the exemplary application scenarios described hereafter, many other application scenarios are also possible.

Consider an application scenario where the venue is an office building having a plurality of conference rooms. One or more beacon devices is installed into each of the conference rooms, and each of the meetings that is scheduled for each conference room is scheduled in a given calendar management source. Suppose the calendar management source has Bob scheduled to attend a first meeting in conference room A from 2 pm to 3 pm, and also has Bob scheduled to attend a second meeting in conference room A from 3 pm to 4 pm. A set of broadcast rules can be generated for and downloaded to the beacon devices installed into conference room A that specifies a first beacon signal announcing the first meeting to be periodically broadcast by these beacon devices starting at 2 pm (or a prescribed short period of time there-before) and ending at 3 pm, and specifies a second beacon signal announcing the second meeting to be periodically broadcast by these beacon devices starting at 3 pm and ending at 4 pm, where the second beacon signal is different than the first beacon signal. When Bob enters conference room A (more specifically, the broadcast range of the beacon devices installed into conference room A) to participate in the first meeting Bob's mobile computing device will detect the first beacon signal and based on this detection may then trigger an appropriate mobile application running on Bob's mobile computing device to inform the calendar management source that Bob is present at the first meeting. In the case where Bob does not leave and re-enter conference room A to participate in the second meeting, but rather stays in conference room A, Bob's mobile computing device will detect the second beacon signal and based on this detection may then trigger the mobile application to inform the calendar management source that Bob is present at the second meeting. As such, the set of broadcast rules that was generated for and downloaded to the beacon devices in conference room A advantageously simulates Bob's mobile computing device moving out of and then back into the broadcast range of the beacon devices between the end of the first meeting and the start of the second meeting. Similarly, a set of broadcast rules can be individually generated for and downloaded to the beacon devices installed into each of the other conference rooms in the office building, where the set of broadcast rules for a given other conference room can specify that different beacon signals are to be periodically broadcast by the beacon devices installed into this conference room based on how it is scheduled.

Another set of broadcast rules can also be generated for and downloaded to the beacon devices installed into conference room A that specifies a third beacon signal announcing "I'm conference room A" to be periodically broadcast by these beacon devices throughout the day (e.g., the first and third beacon signals would be broadcast in an interleaved manner, and the second and third beacon signals would also be broadcast in an interleaved manner). In the case where the calendar management source indicates that no meetings are scheduled for conference room A from 4 pm to 5 pm, yet another set of broadcast rules can also be generated for and downloaded to the beacon devices installed into conference room A that specifies a fourth beacon signal announcing "I'm free" to be broadcast by these beacon devices between 4 pm and 5 pm. If a given user passes by conference room A between 4 pm and 5 pm their mobile computing device will detect the fourth beacon signal and based on this detection may then trigger an appropriate mobile application running on the user's mobile computing device to inform the user that conference room A is available for use until 5 pm.

Consider another application scenario where the just-described office building has a large conference room that includes a physical partition that may be closed to separate the large conference room into two separate smaller conference rooms. A first beacon device is installed into one side of the large conference room such that the first beacon device resides in one of the smaller conference rooms, and a second beacon device is installed into the other side of the large conference room such that the second beacon device resides in the other of the smaller conference rooms. In the case where the calendar management source indicates that a large meeting is scheduled for the large conference room (e.g., the partition is left open), the set of broadcast rules that is generated for and downloaded to the first beacon device (hereafter simply referred to as the first set of broadcast rules) can be coordinated with the set of broadcast rules that is generated for and downloaded to the second beacon device (hereafter simply referred to as the second set of broadcast rules) as follows. The first and second sets of broadcast rules can specify that the broadcast power for the first and second beacon devices is to be increased such that their broadcast ranges may overlap. The first and second sets of broadcast rules can also specify that the same one or more beacon signals is to be periodically broadcast by the first and second beacon devices. As such, in this case the first and second beacon devices are effectively operating as one. In the case where the calendar management source indicates that two different small meetings are scheduled for the large conference room (e.g., the partition is closed), the first and second sets of broadcast rules can be coordinated as follows. The first and second sets of broadcast rules can specify that the broadcast power for the first and second beacon devices is to be decreased such that their broadcast ranges do not overlap. The first set of broadcast rules can also specify that one of the beacon signals to be periodically broadcast by the first beacon device uniquely identifies the one of the small meetings that is scheduled for the small room in which the first beacon device is installed. The second set of broadcast rules can also specify that one of the beacon signals to be periodically broadcast by the second beacon device uniquely identifies the other of the small meetings that is scheduled for the small room in which the second beacon device is installed. As such, in this case the first and second beacon devices are operating independently in a manner that ensures there is no conflict or unwanted interference between the first and second beacon devices.

Consider yet another application scenario where an emergent event notification associated with the just-described office building's geographic location is received from a given emergent event notification source (e.g., a conventional AMBER alert or NOAA weather alert is received from the aforementioned (PAWS system). In this case the set of broadcast rules that is generated for and downloaded to each of the beacon devices that is installed into the office building can include a beacon signal having data that is specifically related to the emergent event. Upon a given mobile computing device detecting this beacon signal, an appropriate mobile application running on the mobile computing device may be triggered to display this data, thus informing the user of the mobile computing device about the emergent event.

Consider yet another application scenario where the venue is a shopping mall that includes an ice cream shop and a facility monitoring system that is configured to monitor the outside temperature around the mall. A plurality of beacon devices are installed into different physical locations within the mall. In the case were an emergent event notification indicating that the outside temperature is currently above a prescribed threshold is received from the facility monitoring system, the set of broadcast rules that is generated for and downloaded to each of the beacon devices can include a beacon signal having data that indicates the ice cream shop is currently having a 20 percent off sale. Upon a given mobile computing device detecting this beacon signal, an appropriate mobile application running on the mobile computing device may be triggered to display this data, thus informing the user of the mobile computing device about the sale that is underway at the ice cream shop.

Figure 5:
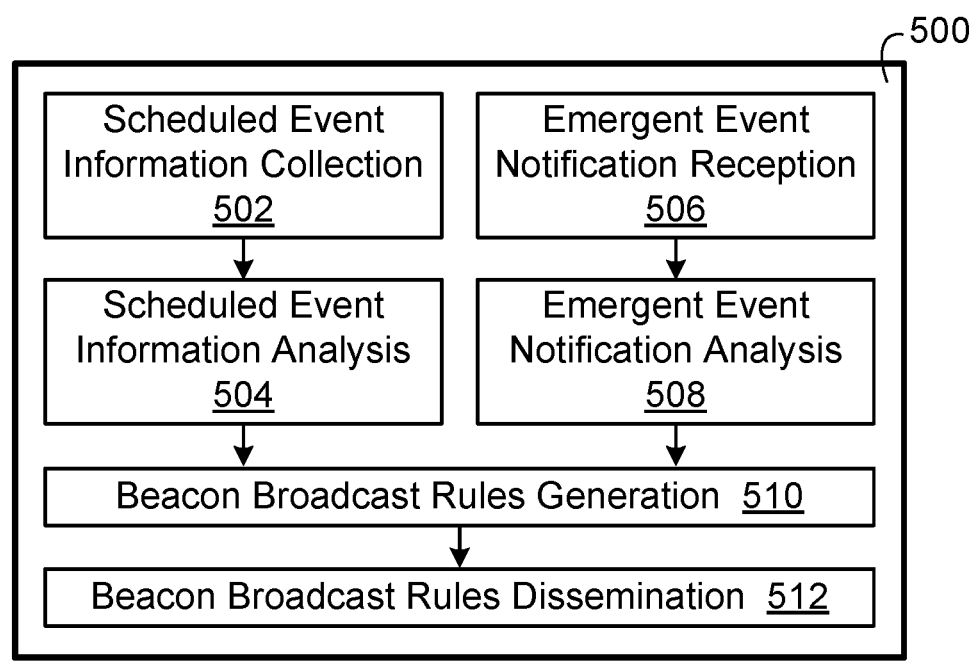
FIG. 5 is a diagram illustrating an exemplary implementation, in simplified form, of a beacon controller computer program for controlling broadcasts from one or more beacon devices each of which is disposed in a known different physical location within a venue.

FIG. 5 illustrates an exemplary implementation, in simplified form, of a beacon controller computer program for controlling broadcasts from one or more beacon devices each of which is disposed in a known different physical location within a venue. As exemplified in FIG. 5 and referring again to FIGS. 3 and 4, the beacon controller computer program 500 includes, but is not limited to, a scheduled event information collection sub-program 502 that performs action 300, a scheduled event information analysis sub-program 504 that performs action 302, an emergent event notification reception sub-program 506 that performs action 400, an emergent event notification analysis sub-program 508 that performs action 402, a beacon broadcast rules generation sub-program 510 that performs actions 304 and 404, and a beacon broadcast rules dissemination sub-program 512 that performs actions 306 and 406. Each of the just-described sub-programs is realized on a computing device such as that which is described in more detail in the Exemplary Operating Environments section which follows. More particularly and by way of example but not limitation, and referring again to FIGS. 1 and 2, in one implementation of the beacon broadcasting technique implementations described herein the just-described sub-programs may all be realized on the one or more computing devices 122/124 upon which the beacon control service 120 operates. In another implementation of the beacon broadcasting technique the just-described sub-programs may all be realized on the computing device 212 upon which the beacon control service 210 operates.

2.0 Other Implementations

While the beacon broadcasting technique has been described by specific reference to implementations thereof, it is understood that variations and modifications thereof can be made without departing from the true spirit and scope of the beacon broadcasting technique. By way of example but not limitation, in the case where a given beacon device includes additional functionality such as a light, or a motion sensor, or a temperature sensor, or a sound generator, or other types of additional functionality, the set of broadcast rules that is generated for and downloaded to the beacon device may independently control this additional functionality. For example, the set of broadcast rules may turn off one or more elements of this additional functionality during prescribed periods of time (e.g., during normal business hours on weekdays) in order to conserve the beacon device's battery life (or for other reasons), and then turn on these functionality elements during other prescribed periods of time (e.g., during evening hours on weekdays and during the entire day on weekend days) as a security measure (or for other reasons).

It is also noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 6:
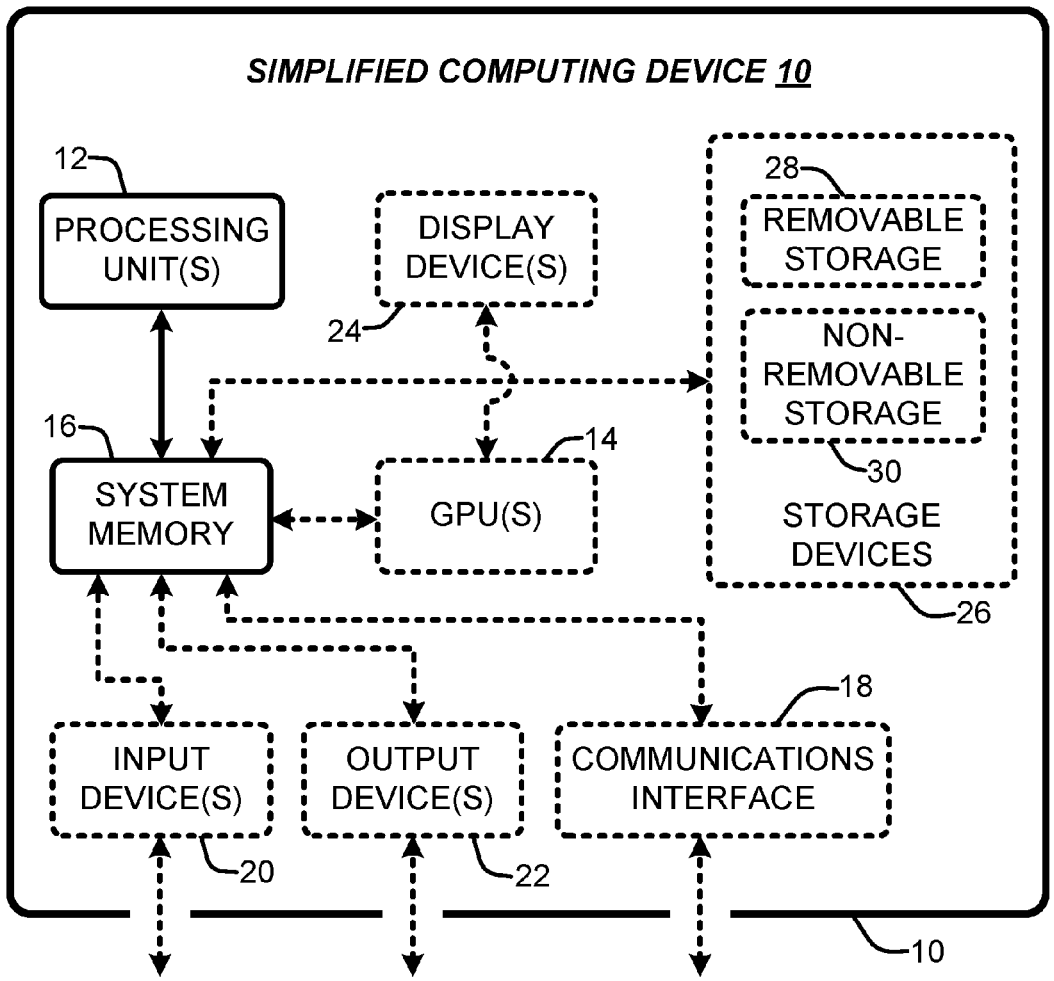
FIG. 6 is a diagram illustrating a simplified example of a general-purpose computer system on which various implementations and elements of the beacon broadcasting technique, as described herein, may be realized.

The beacon broadcasting technique implementations described herein are operational within numerous types of general purpose or special purpose computing system environments or configurations. FIG. 6 illustrates a simplified example of a general-purpose computer system on which various implementations and elements of the beacon broadcasting technique, as described herein, may be implemented. It is noted that any boxes that are represented by broken or dashed lines in the simplified computing device 10 shown in FIG. 6 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the beacon broadcasting technique implementations described herein, the device should have a sufficient computational capability and system memory to enable basic computational operations. In particular, the computational capability of the simplified computing device 10 shown in FIG. 6 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18 which may include mesh networking support for low-cost devices. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the beacon broadcasting technique implementations described herein, including input, output, control, feedback, and response to one or more users or other devices or systems associated with the beacon broadcasting technique implementations, are enabled by a variety of Natural User Interface (NUI) scenarios. The NUI techniques and scenarios enabled by the beacon broadcasting technique implementations include, but are not limited to, interface technologies that allow one or more users user to interact with the beacon broadcasting technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the beacon broadcasting technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the beacon broadcasting technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 6 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various beacon broadcasting technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The beacon broadcasting technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The beacon broadcasting technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation a first system is employed for controlling broadcasts from one or more beacon devices each of which is disposed in a known different physical location within a venue. This system includes a beacon controller that includes one or more computing devices, these computing devices being in communication with each other via a computer network whenever there is a plurality of computing devices, and a computer program having a plurality of sub-programs executable by these computing devices, these computing devices being directed by the sub-programs of the computer program to, collect scheduling information for one or more events that are scheduled to take place at the venue from one or more calendar management sources, analyze this collected scheduling information, use the result of this analysis and the knowledge of the physical location of each of the beacon devices to generate a set of broadcast rules for each of the beacon devices, these rules specifying one or more beacon signals to be periodically broadcast by the beacon device and the timing by which these signals are to be broadcast, and for each of the beacon devices, download the set of broadcast rules for the beacon device to the beacon device.

In one implementation of the just-described first system the calendar management sources include a shared calendaring application running on the one or more computing devices. In another implementation the calendar management sources include one or more personal calendaring applications running on the client computing devices of one or more users who visit the venue, these client computing devices being in communication with the one or more computing devices via the network. In another implementation the calendar management sources include a venue-specific calendaring application running on one of: the one or more computing devices; or one or more other computing devices that are in communication with the one or more computing devices via the network. In another implementation, for each of the beacon devices, the set of broadcast rules that is generated for the beacon device is coordinated with the sets of broadcast rules that are generated for others of the beacon devices which are nearby the beacon device so as to eliminate conflict and unwanted interference between the beacon signals being periodically broadcast by the beacon device and the beacon signals being periodically broadcast by these others of the beacon devices.

In another implementation each of the beacon signals includes a Globally Unique Identifier data field. In one version of this implementation each of the beacon signals further includes a major identifier data field and a minor identifier data field. In another version of this implementation each of the beacon signals further includes a data field having customizable data that is associated with a one of the events.

In another implementation the set of broadcast rules that is generated for a given one of the beacon devices specifies, a list of different beacon signals to be periodically broadcast on a rotating basis by the one of the beacon devices, and a rotation time interval specifying how often the one of the beacon devices is to change the beacon signal it is periodically broadcasting. In one version of this implementation the set of broadcast rules that is generated for the given one of the beacon devices further specifies the interval of time between successive broadcasts of each of the different beacon signals in the list of different beacon signals.

In another implementation the set of broadcast rules that is generated for a given one of the beacon devices specifies the broadcast power for this one of the beacon devices. In another implementation the set of broadcast rules that is generated for a given one of the beacon devices specifies a static beacon signal to be periodically broadcast by this one of the beacon devices. In one version of this implementation the set of broadcast rules that is generated for the given one of the beacon devices further specifies the interval of time between successive broadcasts of the static beacon signal. In another implementation the computing devices are further directed by the sub-programs of the computer program to: receive notification of an emergent event that is associated with the venue or its geographic location from one or more emergent event notification sources, analyze this emergent event notification, use the result of this emergent event notification analysis and the knowledge of the physical location of each of the beacon devices to generate an additional set of broadcast rules for each of the beacon devices, this additional set of broadcast rules specifying one or more additional beacon signals to be periodically broadcast by the beacon device and the timing by which these additional signals are to be broadcast, these additional signals including data that is specifically related to the emergent event, and for each of the beacon devices, download the additional set of broadcast rules for the beacon device to the beacon device.

The implementations described in any of the previous paragraphs in this section may also be combined with each other, and with one or more of the implementations and versions described prior to this section. For example, some or all of the preceding implementations and versions may be combined with the foregoing implementation where the calendar management sources include one or more personal calendaring applications running on the client computing devices of one or more users who visit the venue, these client computing devices being in communication with the one or more computing devices via the network. In addition, some or all of the preceding implementations and versions may be combined with the foregoing implementation where the calendar management sources include a venue-specific calendaring application running on one of: the one or more computing devices; or one or more other computing devices that are in communication with the one or more computing devices via the network. In addition, some or all of the preceding implementations and versions may be combined with the foregoing implementation where the set of broadcast rules that is generated for a given one of the beacon devices specifies the broadcast power for this one of the beacon devices.

In another implementation a second system is employed for controlling broadcasts from one or more beacon devices each of which is disposed in a known different physical location within a venue. This system includes a beacon controller that includes one or more computing devices, these computing devices being in communication with each other via a computer network whenever there is a plurality of computing devices, and a computer program having a plurality of sub-programs executable by these computing devices, these computing devices being directed by the sub-programs of the computer program to, receive notification of an emergent event that is associated with the venue or its geographic location from one or more emergent event notification sources, analyze this received notification, use the result of this analysis and the knowledge of the physical location of each of the beacon devices to generate a set of broadcast rules for each of the beacon devices, these rules specifying one or more beacon signals to be periodically broadcast by the beacon device and the timing by which these signals are to be broadcast, these signals including data that is specifically related to the emergent event, and for each of the beacon devices, download the set of broadcast rules for the beacon device to the beacon device.

In one implementation of the just-described second system the emergent event notification sources include an Integrated Public Alert and Warning System that is in communication with the one or more computing devices via the network. In another implementation the emergent event notification sources include a facility monitoring system that is configured to monitor one or more conditions in one or more portions of the venue, and is in communication with the one or more computing devices via the network. In another implementation the emergent event notification sources include one or more calendar management sources.

The implementations described in any of the previous paragraphs in this section may also be combined with each other, and with one or more of the implementations and versions described prior to this section. For example, some or all of the preceding implementations and versions may be combined with the foregoing implementation where the emergent event notification sources include a facility monitoring system that is configured to monitor one or more conditions in one or more portions of the venue, and is in communication with the one or more computing devices via the network. In addition, some or all of the preceding implementations and versions may be combined with the foregoing implementation where the emergent event notification sources include one or more calendar management sources.

In another implementation a computer-implemented process is employed for controlling broadcasts from one or more beacon devices each of which is disposed in a known different physical location within a venue. This process includes the actions of: using one or more computing devices to perform the following process actions, the computing devices being in communication with each other via a computer network whenever a plurality of computing devices is used: collecting scheduling information for one or more events that are scheduled to take place at the venue from one or more calendar management sources, analyzing this collected scheduling information, using the result of this analysis and the knowledge of the physical location of each of the beacon devices to generate a set of broadcast rules for each of the beacon devices, these rules specifying one or more beacon signals to be periodically broadcast by the beacon device and the timing by which these signals are to be broadcast, and for each of the beacon devices, downloading the set of broadcast rules for the beacon device to the beacon device.

In one implementation of the just-described process the process further includes the actions of: using the computing devices to perform the following process actions: receiving notification of an emergent event that is associated with the venue or its geographic location from one or more emergent event notification sources, analyzing this emergent event notification, using the result of this emergent event notification analysis and the knowledge of the physical location of each of the beacon devices to generate an additional set of broadcast rules for each of the beacon devices, this additional set of broadcast rules specifying one or more additional beacon signals to be periodically broadcast by the beacon device and the timing by which these additional beacon signals are to be broadcast, these additional beacon signals including data that is specifically related to the emergent event, and for each of the beacon devices, download the additional set of broadcast rules for the beacon device to the beacon device.

In another implementation a first beacon broadcast controlling system is implemented by a means for controlling broadcasts from one or more beacon devices each of which is disposed in a known different physical location within a venue. The first beacon broadcast controlling system includes a first beacon controller means that includes one or more computing devices. These computing devices are in communication with each other via a computer network whenever there is a plurality of computing devices. These computing devices include processors configured to, collect scheduling information for one or more events that are scheduled to take place at the venue from one or more calendar management sources, analyze this collected scheduling information, use the result of this analysis and the knowledge of the physical location of each of the beacon devices to generate a set of broadcast rules for each of the beacon devices, these rules specifying one or more beacon signals to be periodically broadcast by the beacon device and the timing by which these signals are to be broadcast, and for each of the beacon devices, download the set of broadcast rules for the beacon device to the beacon device.

In one version of the just-described first beacon broadcast controlling system the processors are further configured to: receive notification of an emergent event that is associated with the venue or its geographic location from one or more emergent event notification sources, analyze this emergent event notification, use the result of this emergent event notification analysis and the knowledge of the physical location of each of the beacon devices to generate an additional set of broadcast rules for each of the beacon devices, this additional set of broadcast rules specifying one or more additional beacon signals to be periodically broadcast by the beacon device and the timing by which these additional signals are to be broadcast, these additional signals including data that is specifically related to the emergent event, and for each of the beacon devices, download the additional set of broadcast rules for the beacon device to the beacon device.

In another implementation a second beacon broadcast controlling system is implemented by a means for controlling broadcasts from one or more beacon devices each of which is disposed in a known different physical location within a venue. The second beacon broadcast controlling system includes a second beacon controller means that includes one or more computing devices. These computing devices are in communication with each other via a computer network whenever there is a plurality of computing devices. These computing devices include processors configured to, receive notification of an emergent event that is associated with the venue or its geographic location from one or more emergent event notification sources, analyze this received notification, use the result of this analysis and the knowledge of the physical location of each of the beacon devices to generate a set of broadcast rules for each of the beacon devices, these rules specifying one or more beacon signals to be periodically broadcast by the beacon device and the timing by which these signals are to be broadcast, these signals including data that is specifically related to the emergent event, and for each of the beacon devices, download the set of broadcast rules for the beacon device to the beacon device.

Wherefore, what is claimed is:

1. A system for controlling beacon broadcasts, comprising:
   one or more beacon devices each of which is disposed in a known different physical location within a venue, and
   a beacon controller comprising one or more computing devices, said computing devices being in communication with each other via a computer network whenever there is a plurality of computing devices, and a computer program having a plurality of sub-programs executable by said computing devices, said computing devices being directed by the sub-programs of the computer program to,
   collect scheduling information for one or more events that are scheduled to take place at the venue from one or more calendar management sources,
   analyze said collected scheduling information,
   use the result of said analysis and the knowledge of the physical location of each of the beacon devices to generate a set of broadcast rules for each of the beacon devices, said rules specifying a list of different beacon signals to be periodically broadcast on a rotating basis by the beacon device and a rotation time interval specifying how often the beacon device is to change the beacon signal it is periodically broadcasting, wherein said signals comprise information about the events that are scheduled to take place at the venue, and
   for each of the beacon devices, download the set of broadcast rules for the beacon device to the beacon device.

2. The system of claim 1, wherein the calendar management sources comprise a shared calendaring application running on the one or more computing devices.

3. The system of claim 1, wherein the calendar management sources comprise one or more personal calendaring applications running on the client computing devices of one or more users who visit the venue, said client computing devices being in communication with the one or more computing devices via the network.

4. The system of claim 1, wherein the calendar management sources comprise a venue-specific calendaring application running on one of:
   the one or more computing devices; or
   one or more other computing devices that are in communication with the one or more computing devices via the network.

5. The system of claim 1, wherein, for each of the beacon devices, the set of broadcast rules that is generated for the beacon device is coordinated with the sets of broadcast rules that are generated for others of the beacon devices which are nearby the beacon device so as to eliminate conflict and unwanted interference between the beacon signals being periodically broadcast by the beacon device and the beacon signals being periodically broadcast by said others of the beacon devices.

6. The system of claim 1, wherein each of the beacon signals comprises a Globally Unique Identifier data field.

7. The system of claim 6, wherein each of the beacon signals further comprises a major identifier data field and a minor identifier data field.

8. The system of claim 6, wherein each of the beacon signals further comprises a data field comprising customizable data that is associated with a one of said events.

9. The system of claim 1, wherein the set of broadcast rules that is generated for the given one of the beacon devices further specifies the interval of time between successive broadcasts of each of the different beacon signals in said list.

10. The system of claim 1, wherein the set of broadcast rules that is generated for a given one of the beacon devices specifies the broadcast power for said one of the beacon devices.

11. The system of claim 1, wherein said computing devices are further directed by the sub-programs of the computer program to:
   receive notification of an emergent event that is associated with the venue or its geographic location from one or more emergent event notification sources,
   analyze said emergent event notification,
   use the result of said emergent event notification analysis and the knowledge of the physical location of each of the beacon devices to generate an additional set of broadcast rules for each of the beacon devices, said additional set of broadcast rules specifying one or more additional beacon signals to be periodically broadcast by the beacon device and the timing by which said additional signals are to be broadcast, said additional signals comprising data that is specifically related to the emergent event, and for each of the beacon devices, download the additional set of broadcast rules for the beacon device to the beacon device.

12. A system for controlling beacon broadcasts, comprising:
one or more beacon devices each of which is disposed in a known different physical location within a venue, and
a beacon controller comprising one or more computing devices, said computing devices being in communication with each other via a computer network whenever there is a plurality of computing devices, and a computer program having a plurality of sub-programs executable by said computing devices, said computing devices being directed by the sub-programs of the computer program to,
receive notification of an emergent event that is associated with the venue or its geographic location from one or more emergent event notification sources,
analyze said received notification,
use the result of said, analysis and the knowledge of the physical location of each of the beacon devices to generate a set of broadcast rules for each of the beacon devices, said rules specifying a list of different beacon signals to be periodically broadcast on a rotating basis by the beacon device and a rotation time interval specifying how often the beacon device is to change the beacon signal it is periodically broadcasting, wherein said signals comprise data that is specifically related to said emergent event, and
for each of the beacon devices, download the set of broadcast rules for the beacon device to the beacon device.

13. The system of claim 12, wherein the emergent event notification sources comprise an Integrated Public Alert and Warning System that is in communication with the one or more computing devices via the network.

14. The system of claim 12, wherein the emergent event notification sources comprise a facility monitoring system that is configured to monitor one or more conditions in one or more portions of the venue, and is in communication with the one or more computing devices via the network.

15. The system of claim 12, wherein the emergent event notification sources comprise one or more calendar management sources.

16. A computer-implemented process for controlling broadcasts from one or more beacon devices each of which is disposed in a known different physical location within a venue, comprising the actions of:
using one or more computing devices to perform the following process actions, the computing devices being in communication with each other via a computer network whenever a plurality of computing devices is used:
collecting scheduling information for one or more events that are scheduled to take place at the venue from one or more calendar management sources,
analyzing said collected scheduling information,
using the result of said analysis and the knowledge of the physical location of each of the beacon devices to generate a set of broadcast rules for each of the beacon devices, said rules specifying a list of different beacon signals to be periodically broadcast on a rotating basis by the beacon device and a rotation time interval specifying how often the beacon device is to change the beacon signal it is periodically broadcasting, wherein said signals comprise information about the events that are scheduled to take place at the venue, and
for each of the beacon devices, downloading the set of broadcast rules for the beacon device to the beacon device.

17. The process of claim 16, further comprising the actions of:
using the computing devices to perform the following process actions:
receiving notification of an emergent event that is associated with the venue or its geographic location from one or more emergent event notification sources,
analyzing said emergent event notification,
using the result of said emergent event notification analysis and the knowledge of the physical location of each of the beacon devices to generate an additional set of broadcast rules for each of the beacon devices, said additional set of broadcast rules specifying one or more additional beacon signals to be periodically broadcast by the beacon device and the timing by which said additional beacon signals are to be broadcast, said additional beacon signals comprising data that is specifically related to the emergent event, and
for each of the beacon devices, download the additional set of broadcast rules for the beacon device to the beacon device.

* * * * *